United States Patent [19]
Caffrey et al.

[11] 3,808,069
[45] Apr. 30, 1974

[54] FORMING WINDOWS IN COMPOSITE DIELECTRIC LAYERS

[75] Inventors: Robert Emmett Caffrey, Allentown; Austin Charles Dumbri, Easton; Richard Norman Tauber, Allentown, all of Pa.

[73] Assignee: Bell Telephone Laboratories, Incorporated, Murray Hill, Berkeley Heights, N.J.

[22] Filed: Mar. 15, 1972

[21] Appl. No.: 234,904

[52] U.S. Cl. .......... 156/11, 156/13, 156/17
[51] Int. Cl. .......... H01l 7/50
[58] Field of Search .......... 156/3, 8, 11, 16, 17, 13; 29/578; 317/234, 235

[56] References Cited

UNITED STATES PATENTS

| | | | |
|---|---|---|---|
| 3,551,196 | 12/1970 | Herczog et al. | 156/17 X |
| 3,689,392 | 9/1972 | Sandera | 204/192 |
| 3,607,480 | 9/1971 | Harrap | 156/17 |

*Primary Examiner*—William A. Powell
*Attorney, Agent, or Firm*—W. L. Keefauver, P. V. D. Wilde

[57] ABSTRACT

In etching windows through dual dielectric layers, undercutting while etching the underlying layer produces in the surface layer a ledge which overlays the window. This ledge interferes with subsequent processing techniques and has been implicated as a major contributor to low yields in IC processing. The identification of the ledge problem and the removal of the ledge by re-etching the surface layer form the basis for the invention. Since the layer in which the ledge develops is masked, it is necessary to etch the ledge from the underside. In this operation, the underlying layer functions as an inverted, in-situ mask.

1 Claim, 4 Drawing Figures

ETCH NITRIDE

ETCH OXIDE

ETCH NITRIDE USING INVERTED OXIDE MASK-REMOVE METAL MASK

FORMING WINDOWS IN COMPOSITE DIELECTRIC LAYERS

BACKGROUND OF THE INVENTION

The use of dual insulators is now rather common in the fabrication of silicon devices and integrated circuits, and allows the device designer the advantage of combining the desirable properties of more than one material. One of the prominent dual dielectric combinations is $SiO_2$-$Si_3N_4$. The primary coating for silicon has invariably been silicon dioxide largely because the primary interface properties are critical, and techniques for controllably reproducing a high quality, Si-$SiO_2$ interface have already been developed. However, $SiO_2$ is not completely satisfactory as a passivating material. It is susceptible to sodium penetration, a known deleterious contamination. Silicon nitride is an effective sodium barrier, hence the advantageous $SiO_2$-$Si_3N_4$ combination. This and other combinations are useful for other reasons. For example, the dielectric characteristics of the insulator in a field effect device can be tailored by using different materials to achieve a desired threshold. The fixed charge density is important in this connection, and is also the property that is relied upon for various memory functions. The fixed charge is often characteristic of the material used so that the use of different materials provides flexibility in controlling this property. Memory devices that rely on storing charge at a dielectric interface also use dual dielectric layers.

In addition to the $SiO_2$-$Si_3N_4$ combination, the combination of $SiO_2$ with $Al_2O_3$ has been used in these applications. Other combinations are useful as well.

In the process of fabricating devices with multiple dielectrics, it is necessary to provide openings or windows through the layers, usually so that metal leads can be applied which contact the underlying semiconductor. Typically, the openings are made using a separate etch step for each layer because the materials have different solubility characteristics. Since the etching behavior in these materials is essentially isotropic, during these etching operations etching proceeds laterally as well as through the layers.

When the window is opened in the first layer, if the first material is not appreciably attacked by the etchant used for the underlying layer, a ledge will develop in the form of an overhanging perimeter of the first layer around the window. This results from lateral etching of the second layer underneath the first. An important aspect of this invention is the appreciation of the development and consequences of this ledge. Investigations have implicated these ledges as responsible for failures of dual dielectric layer devices, and have identified several potential failure mechanisms. Metal leads applied to these windows are apt to be defective because of the discontinuity presented by the ledge. The ledge can also interfere with other processing operations. For example, it is common to sputter a metal into the windows to form a metal silicide layer. However, with a ledge present, the ledge can produce a shadow effect and prevent the metal from covering the entire window. A metal contact, deposited later on the incompletely covered silicon, can short directly to the silicon.

Still another difficulty due to the undesirable ledge occurs when back sputtering is used as a method of metallization pattern definition. During a back sputtering operation there are occasions when the metal being removed from the window collects under the ledge and produces a conductive filament. This filament may cause an electrical defect in the integrated circuit.

A solution for the effective removal of these ledges during processing is to re-etch the layer in which the overhang occurs. According to the discovery embodied in application Ser. No. 234,905, filed concurrently herewith, in the names of V. E. Hauser, P. T. Panousis and V. D. Wohlheiter, and assigned to Bell Telephone Laboratories, Incorporated, the ledge can be removed conveniently, and without the necessity for an additional masking operation, by etching from both the obverse side of the ledge and the exposed surface.

Situations arise in which the mask for the exposed layer of the combination is other than an insulating layer or a photoresist. For example, it may be a metal mask. U.S. Pat. No. 3,519,504, issued July 7, 1970, describes a process for forming windows in $Si_3N_4$ with sharp edge definition. This process utilizes a metal mask, such as molybdenum, tungsten or silicon, to define the etch pattern on the insulating layer. This avoids problems that might otherwise occur when the etch step is too severe for the conventional photoresist mask. Where this mask technique is used in connection with the invention, it is convenient to retain the metal mask in place during the initial formation of the window and during the subsequent ledge removal. In this case, etching during ledge removal proceeds only from the underside of the ledge and is controlled effectively by the in-situ mask formed by the window in the second layer. The metal layer provides an effective mask during both etching operations.

Whereas this invention has and will be described largely in connection with silicon substrates and with specific combinations of materials forming the dual dielectric layer, it should be understood that it is applicable to a wide variety of materials. The invention lies in the treatment of a problem that is largely mechanical and the chemistry of the materials involved and the associated etch processes are largely a matter of established art.

DETAILED DESCRIPTION

Figure 1:
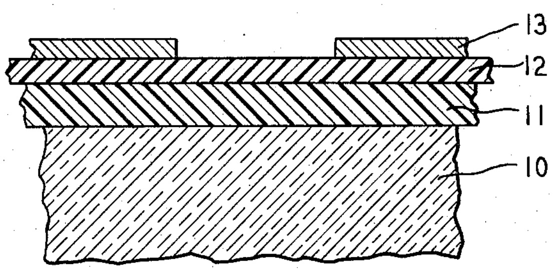

These and other aspects of the invention will be described more specifically in the following detailed description. In the drawing:

FIGS. 1–4 are sectional views through a portion of a device incorporating a dual dielectric layer and illustrate the sequential steps in an exemplary process according to the invention.

Referring to FIG. 1, the substrate 10 is shown with a dual dielectric layer comprising a first $SiO_2$ layer 11 and a second $Si_3N_4$ layer 12. In this embodiment, the substrate 10 is silicon with a resistivity and conductivity type appropriate for the intended device and which, at this stage in the processing, typically includes p-n junctions or other active regions. The objective at this point is to form a window in the dual dielectric layer that is devoid of gross discontinuities produced by the overhang described above. The thickness of the respective layers will depend on the intended device and is not considered a critical aspect of the process except to the extent that the layers will have a minimum thickness of the order of 1,000 angstroms if the ledge problem is to materialize. Typical thicknesses used in practice are defined by the range 0.1 micrometers to 1.0 micrometers. The oxide layer is conventionally steam grown and the nitride layer deposited by pyrolytic reaction, e.g., of silane or of a silicon halide with ammonia. These techniques are well developed in the art. The metal mask 13 is tungsten, a refracting material that has been found to be especially suitable for IC processing. However, there are several useful alternative metals, and it is only essential that the metal layer function as an effective etch mask during both of the subsequent dielectric etch steps. Other metals that can be used are Mo, Si, Ta, any of the six platinum group metals, or, in a generic sense, any metal that provides the essential function just described. The thickness of the metal mask effective for the purpose described will, in general, lie in a range comparable to that of the dielectric layers themselves, i.e., 0.1$\mu$m to 1.0$\mu$m. High resolution processing for present microcircuits usually suggests masking layers of less than 1.0 $\mu$m, and ordinarily there is no advantage in using layers thicker than 0.2$\mu$m.

The metal mask layer 13 is patterned, as shown in FIG. 1, with a conventional photoresist operation to define the boundaries of the window. The tungsten may be etched with a 3:1 solution of potassium ferricyanide and potassium hydroxide. The same solution is useful for molybdenum.

Figure 2:
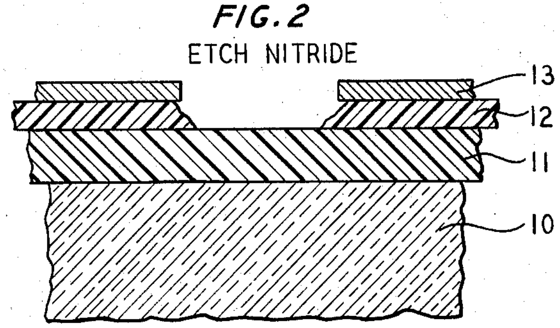

Using the patterned metal layer 13 as a mask, the nitride layer 12 is etched through its thickness with hot phosphoric acid. The resulting structure is shown in FIG. 2.

Figure 3:
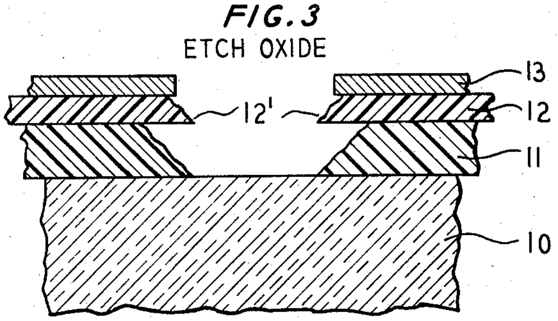
Figure 4:
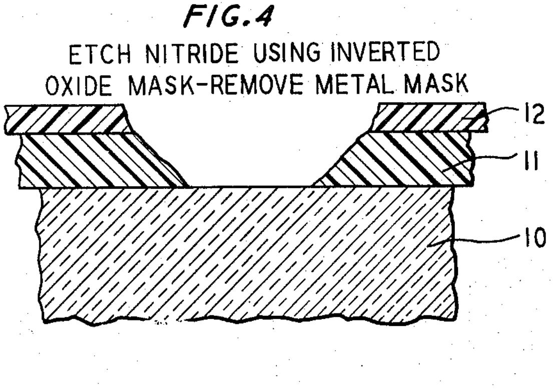

Using the nitride layer 12 as a mask, the oxide layer 11 is then etched through its thickness with a standard HF etchant. The structure that remains is shown in FIG. 3. The deleterious ledges 12' are evident at this stage in the processing. For reasons detailed above, it is important to remove these ledges at this approximate stage in the processing.

The ledges 12' are removed by re-etching the nitride layer, using the oxide layer 11 as a reverse mask. The top surface of the layer 12 is protected by the continued presence of the metal mask 13. During this step, the hot phosphoric acid may attack the exposed silicon. If this attack is too severe, the modified etch described in United States patent application, Ser. No. 177,840, filed Sept. 3, 1971, by P. T. Panousis and H. A. Waggener, now patent No. 3,715,249, may be used. The metal layer 13 is then removed with, for example, the aforementioned etch solution for tungsten, leaving the structure shown in FIG. 4.

The use of $Al_2O_3$, rather than $Si_3N_4$ in the composite layer, is straightforward. An appropriate etch for $Al_2O_3$ is hot phosphoric acid.

While it is necessary, according to the invention, that the outer layer be etched through its thickness, situations may arise in which the underlying layer is only partly etched through its thickness. The partial windows can be used, for example, for defining impurity regions using ion implantation or for making connection to the substrate by capacitive coupling.

Various additional modifications and extensions of this invention will become apparent to those skilled in the art. All such variations and deviations which basically rely on the teachings through which this invention has advanced the art are properly considered to be within the spirit and scope of this invention.

What is claimed is:

1. A method for producing a silicon article having a composite dielectric layer on the surface thereof wherein the dielectric layer comprises a composite of a silicon nitride layer overlying a silicon dioxide layer in the plane of the surface, and wherein openings are etched through the composite layer in a manner such that a ledge of the silicon nitride layer overhangs the opening, the method comprising the steps of:

forming on the silicon surface a layer of silicon dioxide having a thickness in the range of 0.1 $\mu$m to 1.0 $\mu$m, depositing a layer of silicon nitride having a thickness in the range of 0.1 $\mu$m to 1.0 $\mu$m, covering the silicon dioxide layer to form the composite layer, applying a masking layer of tungsten having a thickness in the range of 0.1 $\mu$m to 1.0 $\mu$m to the silicon nitride layer to leave exposed a region corresponding to the opening to be formed in the composite layer, etching with hot phosphoric acid the silicon nitride layer through its thickness, etching with hydrofluoric acid through at least a portion of the silicon dioxide layer so that the etchant undercuts the silicon nitride layer and produces an overhang of the silicon nitride layer in the opening, etching with hot phosphoric acid the silicon nitride layer from the underside using the silicon dioxide layer as an in-situ reverse mask and with the aforementioned masking layer in place thereby removing the overhang, and removing the masking layer using a ferricyanidehydroxide etch solution.

* * * * *